(12) United States Patent
Batkilin et al.

(10) Patent No.: US 9,234,967 B2
(45) Date of Patent: Jan. 12, 2016

(54) SYSTEM AND METHOD FOR LINEARIZATION OF MULTI-CAMERA FLAT PANEL X-RAY DETECTORS

(75) Inventors: Eduard Batkilin, Nesher (IL); Irina Karelin, Haifa (IL); Alex Feldman, Nofit (IL)

(73) Assignee: GENERIC IMAGING LTD, Nesher (IL)

( * ) Notice: Subject to any disclaimer, the term of this patent is extended or adjusted under 35 U.S.C. 154(b) by 0 days.

(21) Appl. No.: 14/113,603

(22) PCT Filed: Apr. 24, 2012

(86) PCT No.: PCT/IL2012/050146
§ 371 (c)(1),
(2), (4) Date: Oct. 24, 2013

(87) PCT Pub. No.: WO2012/147082
PCT Pub. Date: Nov. 1, 2012

(65) Prior Publication Data
US 2014/0077086 A1  Mar. 20, 2014

Related U.S. Application Data

(60) Provisional application No. 61/517,672, filed on Apr. 25, 2011.

(51) Int. Cl.
*G01T 1/20* (2006.01)
*G01T 7/00* (2006.01)
(Continued)

(52) U.S. Cl.
CPC . *G01T 1/20* (2013.01); *G01T 7/005* (2013.01); *H04N 5/32* (2013.01)

(58) Field of Classification Search
CPC .................................. G01T 1/20; G02B 23/06
USPC .......................................................... 250/369
See application file for complete search history.

(56) References Cited

U.S. PATENT DOCUMENTS 4,143,271 A  3/1979  Klein et al.
4,424,446 A  1/1984  Inbar et al.
(Continued)

FOREIGN PATENT DOCUMENTS

IL    52873    10/1987

OTHER PUBLICATIONS

International Search Report of Application No. PCT/IL2012/050146 mailed on Sep. 11, 2012.
(Continued)

*Primary Examiner* — Constantine Hannaher
*Assistant Examiner* — Faye Boosalis
(74) *Attorney, Agent, or Firm* — Pearl Cohen Zedek Latzer Baratz LLP (57) ABSTRACT

System and method for linearization of photometric response of an imaging sensor of a multi-camera flat panel X-Ray detector. The linearization includes acquiring by the imaging sensor, during a linearization phase, at least two images related to detectable radiation radiated by a scintillator in response to X-Ray radiation generated by an X-Ray source at a field of view of the imaging sensor, wherein the intensity of the X-Ray radiation generated by the X-Ray source is different for each of the images, measuring by a light energy measurement unit, substantially simultaneously with the acquiring of each of the images, at least two corresponding levels of energy of the detectable radiation, wherein the light energy measurement unit is substantially linear at the range of operation, and calculating an inverse response function to the imaging sensor based on the images and on the corresponding levels of energy.

18 Claims, 3 Drawing Sheets

(51) Int. Cl.
*H04N 5/32* (2006.01)
*G02B 23/06* (2006.01)

(56) References Cited

U.S. PATENT DOCUMENTS

| | | |
|---|---|---|
| 5,335,260 A | 8/1994 | Arnold |
| 7,706,634 B2 | 4/2010 | Schmitt et al. |
| 2003/0076922 A1 | 4/2003 | Wischmann et al. |
| 2006/0013359 A1 | 1/2006 | Schaller et al. |
| 2010/0140487 A1 | 6/2010 | Barrett et al. |
| 2011/0198503 A1 | 8/2011 | Koren et al. |

OTHER PUBLICATIONS

Richard Szeliski. Computer Vision: Algorithms and Applications. Springer, New York, 2010, pp. 25, 30.

Mitsunaga, T., Nayar, S.: Radiometric Self Calibration. In: IEEE Conference on Computer Vision and Pattern Recognition (CVPR). Volume 1. (Jun 1999) 374-380.

European Supplementary Search Report for Application No. 12775979.3, mailed on Oct. 14, 2014.

Tsin et al. "Statistical calibration of CCD imaging process" Computer Vision, 2001. ICCV 2001. Proceedings Eighth IEEE International Conference on (vol. 1 ), Jul. 7, 2001.

SYSTEM AND METHOD FOR LINEARIZATION OF MULTI-CAMERA FLAT PANEL X-RAY DETECTORS

CROSS-REFERENCE TO RELATED APPLICATIONS

This application is a National Phase Application of PCT International Patent Application No. PCT/IL2012/050146, entitled "SYSTEM AND METHOD FOR LINEARIZATION OF MULTI-CAMERA FLAT PANEL X-RAY DETECTORS", International Filing Date Apr. 24, 2012, published on Nov. 1, 2012, as International Patent Application Publication No. WO 2012/147082, which in turn claims priority from U.S. Provisional Patent Application No. 61/516, 672, filed Apr. 25, 2011, both of which are incorporated herein by reference in their entirety.

BACKGROUND OF THE INVENTION

Flat panel X-Ray detectors are in wide use in medicine. Most of these flat panel X-Ray detectors are based on a single light detector chip coupled with a scintillator. However, detectors of such a design are typically expensive. The single detector chip may be replaced by a plurality of less expensive optical sensors (e.g. CCD or CMOS) and lenses, which are arranged into a flat multi-camera array. X-Ray detectors including the multi-camera array may be less expensive in comparison with the single chip detectors since simpler sensors and lenses may be used. In multi-camera X-Ray detectors, each optical sensor acquires optical light irradiation from a segment of the scene as radiated from the scintillator. A complete image may be composed by stitching the plurality of partial images acquired by the plurality of single sensors.

The output image quality may be measured and assessed visually by visibility of the seam between the stitched partial images. Unfortunately, two neighbor images typically have intensity discrepancies in overlapping regions caused by differences in the relevant features of the sensors and their lenses, such as sensor's linearity of light-to-electrical transfer response, unity of optical performance of the lens, dark current, etc.

In addition, the acquired images may be distorted due to non-linearity of radiometric responses of the cameras. The camera radiometric response is the function providing correspondence of image irradiance values into measured intensity values that are output from the camera. Non-linearity of responses may cause image intensity not to be proportional to scene light intensity (irradiance). Off-the shelf CMOS sensors have substantially non-linear responses. Furthermore, response functions vary even between cameras of the same type.

It would, therefore, be desirable to produce an image having values that are nearly or even completely proportional to the scene irradiance. A linearization function to the radiometric response function of each of the cameras of the multi-camera flat panel detector may be estimated using known techniques. These known calibration techniques were developed for correcting non-linearity of optical devices of cameras, e.g. CMOS sensors and lenses. These known calibration techniques involve exposing the optical devices to light having known intensity levels and capturing a corresponding image for each intensity level, to obtain a plurality of calibration points, and calculating a linearization function based on the images and the corresponding known light intensity levels. Since the response of the scintillator, e.g. the relation between the irradiated visible light to the absorbed X-Ray energy level, is substantially linear, theoretically these techniques could be used for correcting of the non-linearity of the optical sensor and the lens of a flat panel X-Ray detectors. However, flat panel X-Ray detectors have X-Ray radiation as input. The optical sensors and lenses are separated from the X-Ray radiation by at least a scintillator layer, and the detector is typically enclosed in a casing. Calibration of the optical part alone will require opening of the casing of the detector for calibration. However, opening of the casing of the X-Ray detector is undesirable since it can, for example, lead to contamination of the system.

Linearity of radiometric responses of the cameras of the flat panel X-Ray detectors may assure the same sensitivity of the detector for different radiation doses. This linearity should be preserved during the entire life span of the X-Ray detector. This again, requires for a simple linearization process, which may be performed regularly in the field, without opening the cover of the detector.

SUMMARY OF THE INVENTION

According to embodiments of the present invention, there is provided a multi-camera flat panel X-Ray detector, the detector may include a scintillator to convert X-Ray radiation generated by an X-Ray source into detectable radiation, at least one imaging sensor to acquire, during a linearization phase, at least two images related to the detectable radiation, at a field of view of the at least one imaging sensor, wherein the intensity of the X-Ray radiation generated by the X-Ray source is different for each of the at least two images, a light energy measurement unit to measure, during the linearization phase, substantially simultaneously with the acquiring of each of the at least two images, at least two corresponding levels of energy of the detectable radiation, wherein the light energy measurement unit is substantially linear at the range of operation, and a processing unit comprising a processor and memory, the processing unit may obtain the at least two images from the at least one imaging sensor, obtain the at least two levels of energy from the light energy measurement unit, and calculate a inverse response function to the at least one imaging sensor based on the at least two images and on the at least two levels of energy.

Furthermore, according to embodiments of the present invention the processing unit may adjust output images of the at least one imaging sensor acquired during routine operation of the detector, using the inverse response function.

Furthermore, according to embodiments of the present invention, the detector may include a phantom to be placed during the linearization phase, between the X-Ray source and the detector, wherein the phantom has varying X-Ray absorption levels along the field of view of the at least one imaging sensor.

Furthermore, according to embodiments of the present invention the processing unit may calculate the inverse response function based on different readings of different pixels of each of the at least two images.

Furthermore, according to embodiments of the present invention the at least one imaging sensor may acquire two images and two corresponding levels of energy.

Furthermore, according to embodiments of the present invention inverse response function may be a polynomial function.

Furthermore, according to embodiments of the present invention the processing unit may calculate the inverse response function based on the relation between the at least two levels of energy.

Furthermore, according to embodiments of the present invention the processing unit may calculate the inverse response function based on an assumption that the relation between detectable radiation energy level present at a first area within a FOV of the at least one imaging sensor while acquiring a first image to detectable radiation energy level present at the first area while acquiring a second image, equals the relation between detectable radiation energy level present at a second area of a FOV of the at least one imaging sensor while acquiring the first image to the detectable radiation energy level present at the second area while acquiring the second image, and equals a relation between a level of detectable radiation energy detected by the light energy measurement unit while acquiring the first image to a level of detectable radiation energy detected by light energy measurement unit while acquiring the second image.

Furthermore, according to embodiments of the present invention, exposure time of the X-Ray source may be different for each of the least two images.

Furthermore, according to embodiments of the present invention the light energy measurement unit may include at least one photo detector to detect levels of energy of the detectable radiation, and an analog to digital converter to receive the detected levels of energy and to convert the detected levels of energy into a digital measure of the levels of energy.

Furthermore, according to embodiments of the present invention, there is provided a method for linearization of photometric response of an imaging sensor of a multi-camera flat panel X-Ray detector, the method may include acquiring, by the imaging sensor, during a linearization phase, at least two images related to detectable radiation present at a field of view of the imaging sensor, the detectable radiation corresponding to X-Ray radiation generated by an X-Ray source, wherein the intensity of the X-Ray radiation generated by the X-Ray source is different for each of the at least two images, measuring by a light energy measurement unit, during the linearization phase, substantially simultaneously with the acquiring of each of the at least two images, at least two corresponding levels of energy of the detectable radiation, wherein the light energy measurement unit is substantially linear at the range of operation, and calculating an inverse response function to the imaging sensor based on the at least two images and on the at least two levels of energy.

Furthermore, according to embodiments of the present invention, the method may include adjusting output images of the imaging sensor acquired during routine operation of the detector, using the inverse response function.

Furthermore, according to embodiments of the present invention, the method may include placing a phantom, during the linearization phase, between the X-Ray source and the detector, wherein the phantom has varying X-Ray absorption levels along the field of view of the imaging sensor.

Furthermore, according to embodiments of the present invention, the method may include calculating the inverse response function based on different readings of different pixels of each of the at least two images.

Furthermore, according to embodiments of the present invention, the method may include acquiring two images and measuring two corresponding levels of energy.

Furthermore, according to embodiments of the present invention, the inverse response function may be a polynomial function.

Furthermore, according to embodiments of the present invention, the inverse response function may be calculated based on the relation between the at least two levels of energy.

Furthermore, according to embodiments of the present invention, the inverse response function may be calculated based on an assumption that the relation between detectable radiation energy level present at a first area within a FOV of the imaging sensor while acquiring a first image to detectable radiation energy level present at the first area while acquiring a second image, equals the relation between detectable radiation energy level present at a second area of a FOV of the imaging sensor while acquiring the first image to the detectable radiation energy level present at the second area while acquiring the second image, and equals a relation between a level of detectable radiation energy detected by the light energy measurement unit while acquiring the first image to a level of detectable radiation energy detected by light energy measurement unit while acquiring the second image.

Furthermore, according to embodiments of the present invention, the method may include using different exposure time of the X-Ray source for each of the least two images.

Furthermore, according to embodiments of the present invention, the method may include detecting levels of energy of the detectable radiation by at least one photo detector, and converting the detected levels of energy into a digital measure of the levels of energy.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Figure 1:
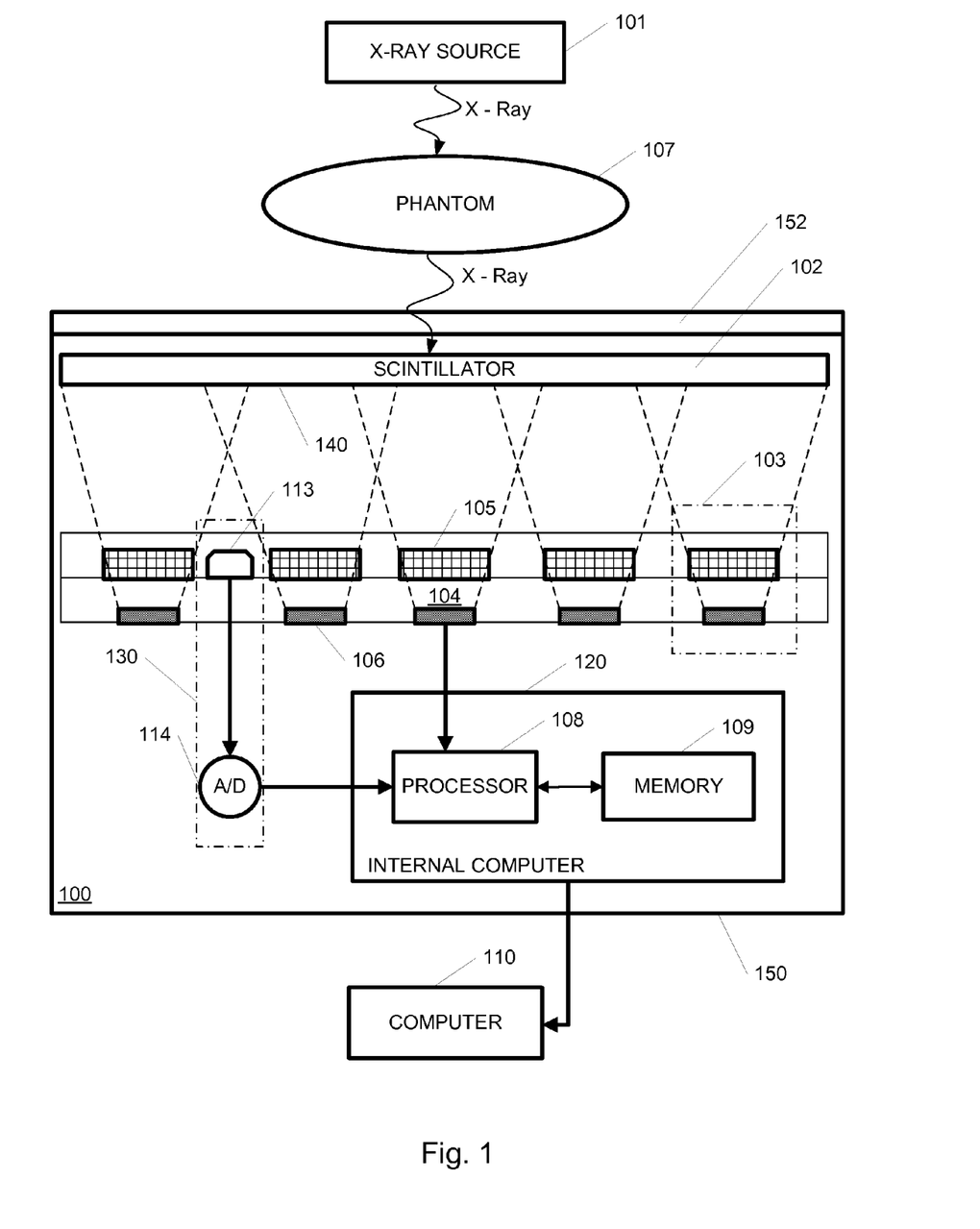
FIG. 1 is a high-level illustration of an exemplary multi-camera flat panel X-Ray detector according to embodiments of the present invention.

Reference is made to FIG. 1 depicting a high-level illustration of an exemplary multi-camera flat panel X-Ray detector 100 according to embodiments of the present invention. According to embodiments of the present invention, detector 100 may include a scintillator layer 102, multi-camera array 104 and a processing unit 120. Detector 100 may be placed inside casing 150 having X-Ray transparent or translucent cover 152.

Scintillator layer 102 may convert X-Ray energy transmitted from X-Ray source 101 into second radiation, typically, at a lower energy that is detectable by imaging sensors 106 and light energy measurement unit 130. For example, Scintillator layer 102 may convert X-Ray energy transmitted from X-Ray source 101 into visible light. Scintillator layer 102 may be made of any scintillating material suitable for converting X-Ray radiation into, for example, visible light, such as Cesium Iodide (CsI) and GOS ($Gd_2O_2S$: Tb). Throughout the present application, the second radiation will be referred to as detectable radiation.

Multi-camera array 104 may include a plurality of imaging sensors 106 and lenses 105. Imaging sensors 106 may be any component capable of producing a digital signal indicative of the detectable radiation impinging on the respective imaging sensor. For example, if detectable radiation is in the range of visible light, imaging sensors 106 may include charge coupled devices (CCDs) or optical complementary metal-oxide-semiconductor (CMOS) sensors, or any other suitable optical sensor, used, for example, for off the shelf digital cameras. Sensors 106 may be arranged in array 104 in any desired configuration, such as linear, 2D array, etc. According to a typical configuration, multi-camera array 104 may include a plurality of optical modules 103, each including a lens 105 and an imaging sensor 106. However, other configuration may exist. Embodiments of the present invention are not confined to a specific lens and optical sensors arrangement.

Detector 100 may include a light energy measurement unit 130 for measuring the level of energy of the detectable radiation radiated by scintillator 102. Light energy measurement unit 130 may measure the level of energy of the detectable radiation using any suitable technique, and should be substantially linear at the range of operation. For example, light energy measurement unit 130 may include at least one photo detector 113, located adjacent to imaging sensors 106 and lenses 105, so that photo detector 113 may sense detectable radiation emitted from scintillator 102. Photo detector 113 may be connected to processor 108 and provide signal indicative of the measured light intensity, for example via an Analog to Digital converter (A/D) 114. Photo detector 113 may include any light sensor, which converts the detectable radiation into a measurable electrical quantity, and is substantially linear at the range of operation. For example, photo detector 113 may include Photodiodes, Photoresistors, etc.

Detector 100 may include an internal computer 120 including a processor 108, adapted to receive signals from imaging sensors 106 and from photo detector 113 and memory unit 109. Detector 100 may be further connected to an external computer 110. For example, external computer 110 may be connected to internal computer 120. External computer 110 may include components such as, but not limited to, a plurality of central processing units (CPU) or any other suitable multi-purpose or specific processors or controllers, a plurality of input units, a plurality of output units, a plurality of memory units, and a plurality of storage units, and may receive commands and present output to an operator of detector 100. External computer 110 may be connected (not shown) also to X-Ray source 101.

Detector 100, external computer 110, or X-Ray source 101, or a third entity (not shown) may initiate imaging by triggering imaging sensors 106 and photo detector 113 substantially simultaneously with X-Ray s from X-Ray source 101. In response to the triggering signal, X-Ray radiation may be emitted by X-Ray source 101. The emitted radiation may pass through a specimen or phantom 107, if present between X-Ray source 101 and detector 100, and be absorbed by scintillator 102. Scintillator 102 may convert the absorbed X-Ray radiation into detectable radiation. The detectable radiation may pass through lenses 105 and be focused on and detected by imaging sensors 106 of camera array 104. At substantially the same time, light energy measurement unit 130 may measure the level of energy of the detectable radiation. For example, the level of energy of the detectable radiation may be measured by photo detector 113 and converted to a digital signal representation by A/D 114. Each imaging sensor 106 may produce a sensor image, substantially representing the detectable radiation radiated by a respective segment 140 of scintillator 102 that is within the field of view (FOV) of imaging sensor 106. The plurality of sensor images produced by camera array 104, as well as the measurement of level of energy of the detectable radiation, may be stored for further processing by internal computer 120 in memory unit 109.

The FOV of each imaging sensor 106 may include a respective segment 140 of scintillator 102. Each section of scintillator 102 that is within the FOV of camera array 104 may be represented in at least one sensor image. Therefore a complete image of the FOV of camera array 104 may be composed, for example, by a processing unit such as internal computer 120 or external computer 110, from the stored sensor images by stitching the sensor images using various stitching techniques as known in the art. The resulting image is the complete X-Ray image.

For simplicity of the explanation, sources of image distortions, such as geometric distortion, as well as other sources of error such as dark current, etc. are disregarded. However it should be readily understood by these skilled in the art that linearization procedures described herein may be used together with other image enhancement techniques, such as removal of dark current noise, for example, using dark frame subtraction, and/or methods used to correct geometrical distortion, vignetting, etc. For example, it may be assumed that other sources of error are being corrected concurrently, before or after the linearization process described herein.

Scintillator images may be geometrically distorted by lenses 105. This distortion is irrelevant for embodiments of the present invention, and therefore will be disregarded herein. Vignetting is another type of image distortion related to lenses 105. Using wide-angle and wide-aperture lenses may cause the resultant image to darken at the edges. Vignetting correction may be done by methods known in the art, concurrently, before or after performing linearization according to embodiments of the present invention.

It is assumed for simplicity and clarity of the mathematical representation, that the matrix of each of imaging sensors 106, as well as the partial images generated by each imaging sensors 106 are rectangular, and that each pixel on imaging sensors 106 is rectangular. The matrix of each of imaging sensors 106 has a size of M×N pixels. It is also assumed that the corresponding segments 140 on the surface of scintillator 102 are rectangular as well. These assumptions are non binding and do not limit embodiments of the present invention.

Segments 140 of scintillator 102 may have the same aspect ratio as the rectangle of imaging sensors 106. As used herein, scintillator pixels may refer to small scintillator rectangles that are within the FOV of the respective pixels of the respective imaging sensors 106. Scintillator pixel matrix of a segment 140 may, therefore, have the dimension of M×N, same as the matrix of imaging sensors 106.

A pixel on a matrix of an imaging sensor 106 has coordinates $(x_s, y_s)$ relatively, for example, to the sensor image left upper corner. Pixel $(x_s, y_s)$ corresponds to a scintillator pixel with coordinates $(x, y)$ relatively to a reference point on scintillator segment 140, for example, to the left upper corner of the partial scintillator image.

Let L(x, y) denote light energy quantity emitted by scintillator pixel with coordinates (x, y).

$$L_s(x_s, y_s) = V(x, y) \cdot L(x, y), \quad \text{(Equation 1)}$$

Where V(x, y) is the vignetting factor depending on properties and location of lens 105 and including also effects of energy loss in lens 105. Photometric response for a given imaging sensor 106 is a function $f_s$ satisfying:

$$E_s(x_s, y_s) = f_s(L_s(x_s, y_s)), \quad \text{(Equation 2)}$$

Where $E_S(x_S, y_S)$ is an output signal from pixel $(x_s, y_s)$, representing the level of light energy at scintillator pixel with coordinates (x, y). The output signal may be, for example, a gray level value of the pixel in the partial image generated by imaging sensor 106. Since function $f_s$ is non-linear, output signal $E_S(x_S, y_S)$ is not proportional to the quantity of light $L_S(x_S, y_S)$ that impinges sensor pixel $(x_s, y_s)$.

Let F denote a linearization function, also referred to as an inverse response function for $E_S(x_S, y_S)$, thus for sensor pixel $(x_s, y_s)$:

$$E_L(x_s, y_s) = F(E_s(x_s, y_s)), \quad \text{(Equation 3)}$$

F should be chosen such that for each pixel, output signal $E_L(x_S, y_S)$ will be substantially linear with the quantity of light $L_S(x_S, y_S)$ that impinges sensor pixel $(x_S, y_S)$ by proportion factor b in the range of operation:

$$E_L(x_s, y_s) = b \cdot L_s(x_s, y_s), \quad \text{(Equation 4)}$$

It should be readily understood by these skilled in the art that ideally, if linearity is achieved, F may be a function which is invert to $f_s$ up to proportion factor b which is specific to a given imaging sensor 106.

Figure 2:
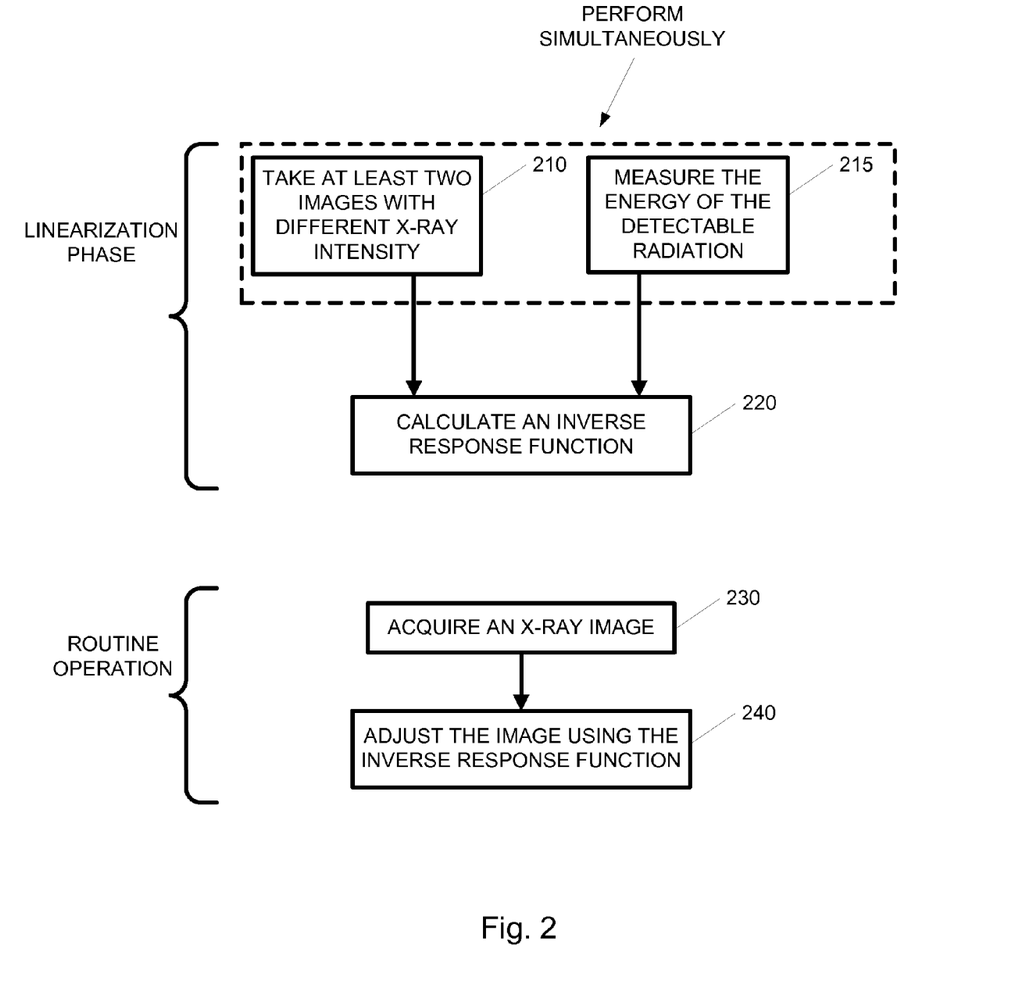
FIG. 2 is a flowchart illustration of a method for linearization of photometric response of an imaging sensor of a multi-camera flat panel X-Ray detector according to embodiments of the present invention.

Reference is now made to FIG. 2 which is a flowchart illustration of a method for linearization of photometric response of an imaging sensor 106 of a multi-camera flat panel X-Ray detector according to embodiments of the present invention. According to embodiments of the present invention, an inverse response function, denoted F, may be calculated during a linearization phase and used for adjusting images during routine operation. The method may be performed by a processing unit that receives data from detector 100, and particularly from imaging sensors 106 and light energy measurement unit 130, such as internal computer 120 or external computer 110.

During the linearization phase, a set of $N_s$ partial images may be acquired 210 by each of imaging sensors 106, where $N_s$ may be equal or larger than two. $N_s$ may be the same or different for each one of imaging sensors 106. The partial images may relate to detectable radiation present at a field of view of the imaging sensor 106, the detectable radiation corresponding to X-Ray radiation generated by X-Ray source 101. For example, a scintillator 102 may be used to convert X-Ray radiation generated by X-Ray source 101 to detectable radiation. The partial images may be acquired with the same scene and different intensity of X-Ray radiation generated by X-Ray source 101. The intensity of the X-Ray radiation generated by X-Ray source may be varied by changing exposure conditions of X-Ray source 101. As used herein a scene may refer to specific position of X-Ray source 101 and position and pose of phantom 107, if used, relatively to the surface of detector 100 and to X-Ray source 101. Exposure conditions may be determined by voltage, current and exposure time of X-Ray tube (not shown) of X-Ray source 101. As known in the art, absorption properties depend mostly on the voltage on an X-Ray tube (not shown) of X-Ray source 101. Therefore, exposure conditions may be changed by varying the exposure time, current or both of X-Ray tube (not shown) X-Ray source 101.

Substantially simultaneously with the acquiring each of the sets of partial images, a corresponding level of energy of the detectable radiation at an area adjacent to the imaging sensors is measured 215. A response function of each of imaging sensors 106 may be recovered 220 based on at least two partial images acquired by that imaging sensor 106 and on the at least two corresponding measured levels of energy of detectable radiation. As used herein, detector data set may refer to a set of partial images acquired by imaging sensors 106 in camera array 104 (a single partial image for each imaging sensor 106), and simultaneous measurement of the level of energy of the detectable radiation from photo detector 113, taken substantially simultaneously.

According to embodiments of the present invention, if the voltage of X-Ray source 101 is not modified between acquiring two X-Ray images by detector 100, then it may be assumed that the relation between detectable radiation energy level present at any sub-section of the FOV of imaging sensors 106 while acquiring the first image, to light energy level present at the same sub-section while acquiring the second image, is constant and preserved along the FOVs of all imaging sensors 106. This relation may also equal the relation between detectable radiation energy level present adjacent to photo detector 113 while acquiring the first image, to detectable radiation energy level present adjacent to photo detector 113 while acquiring the second image. In other words, the relation between detectable radiation energy level present at a first area within a FOV of a selected imaging sensor 106 while acquiring the first image to the detectable radiation energy level present at the first area while acquiring the second image, equals the relation between detectable radiation energy level present at a second area of a FOV of the same imaging sensor or other imaging sensor while acquiring the first image to the detectable radiation energy level present at the second area while acquiring the second image. That ratio is equal to the relation between the level of detectable radiation energy detected by light energy measurement unit 130 while acquiring the first image to the level of detectable radiation energy detected by light energy measurement unit 130 while acquiring the second image These first and second areas may be, for example, a first and a second pixel, or group of pixels, of imaging sensor 106.

It is noted that linear photometric response of imaging sensors 106 would imply that this relation would also be preserved in the output images. However, since in practice the photometric response of imaging sensors 106 is non-linear this relation is not preserved in the output image.

The mathematical representation of the above assumption would be as follows. For detector data sets i and j, two partial images acquired by the same imaging sensor 106 at the same pixel are $L^i(x, y)$ and $L^j(x, y)$, the corresponding photo detector readings are $r^i$ and $r^j$. Thus in accordance with Equation. 1 the following relations hold true:

$$\frac{L_s^i(x, y)}{L_s^j(x, y)} = \frac{L^i(x, y)}{L^j(x, y)} = \frac{r^i}{r^j} = R^{ij} \quad \text{(Equation 5)}$$

Inverse response function, F, of a given imaging sensor 106, may be calculated or approximated based on the assumption presented in eq. 5. A non binding example of such approximation method is presented hereinbelow. It should be readily understood to these skilled in the art that other techniques may be used to calculate or approximate inverse response function F based on the assumption presented hereinabove. Embodiments of the present invention are not limited to the specific example presented hereinbelow.

According to embodiments of the present invention, it may also be assumed that the photometric response of imaging sensors 106 is monotonic function in the range of operation, and that all pixels of a specific imaging sensor 106 have the same photometric response. Inverse response function F may be approximated by a polynomial:

$$E_L(x_s, y_s) = \sum_{n=0}^{p} c_n (E_s(x_s, y_s))^n, \quad \text{(Equation 6)}$$

where $c_n$ are coefficients, and p is the degree of the polynomial. $c_n$ are real numbers. Since all pixels of a specific imaging sensor 106 have substantially the same photometric response, a single set of coefficients $c_n$ may be calculated for each imaging sensor 106. Also, if a phantom 107, having different absorption levels at different regions of a FOV of a specific imaging sensor 106, is placed between X-Ray source and detector 100 while acquiring the images, then a plurality of pairs of output signals $E_S(x_S, y_S)$ with a corresponding reading of photo detector 113 may be obtained from only two partial images. Alternatively or additionally, a plurality of pairs of output signals $E_S(x_S, y_S)$ may be obtained by taking more than two partial images by each imaging sensor, with corresponding readings of photo detector 113, each partial image taken with different exposure conditions.

The coefficients $c_n$ may be calculated using the following set of linear equations:

$$\sum_{n=0}^{p} c_n (E_S^i(x_S, y_S))^n = R^{ij} \sum_{n=0}^{p} c_n (E_S^j(x_S, y_S))^n, \quad \text{(Equation 7)}$$

This set of linear equations may be solved assuming that $c_0=0$ since zero energy of detectable radiation detected by a pixel of an imaging sensor 106 should result in a zero pixel value. $c_1$ may get an arbitrarily defined non-zero value. Equation 7 is based, inter alia, on the assumption presented in Equations 5 and 6.

During routine operation of detector 100, X-Ray images may be acquired 230. The output image of each imaging sensor 106 may be adjusted 240 using the inverse response function F calculated for that imaging sensor 106, according to, for example, equation 3. The plurality of partial images may be stitched to form the complete X-Ray image and the complete X-Ray image may be presented to a viewer.

The intensity of X-Ray radiation emitted by X-Ray source 101 during image acquisition may vary between different images. As a result, the detectable radiation impinging on imaging sensors 106 during image acquisition of the same scene may vary between images taken at different times. These variations of intensity of X-Ray radiation may be the result of various factors that may change between image acquisitions, such as differences in the timing of image acquisition in relation to the timing of emission of radiation by X-Ray source 101. These timing differences may be minimized, however not completely eliminated, by using a common trigger for activating imaging sensors 106 and photo detector 113 substantially simultaneously with emission of X-Ray radiation from X-Ray source 101. Other factors that may cause variations of intensity of X-Ray radiation may include slightly different exposure times and current levels of the X-Ray tube of X-Ray source 101, slightly different distances between X-Ray source 101 and detector 100, etc.

Variations of intensity of X-Ray radiation during image acquisition between images may cause changes in gray level values of the resultant partial and complete images. Hence, different images of the same scene may have different gray level values, different gray level ranges, and different perceivable image intensity. Thus, these images may be erroneously interpreted by a viewer as depicting different scenes. Such differences may lead, for example, to errors in interpreting diagnostic X-Ray images taken during routine operation of detector 101, especially when the same object is being imaged twice at a time difference, for example, to test efficiency of medical treatment.

Figure 3:
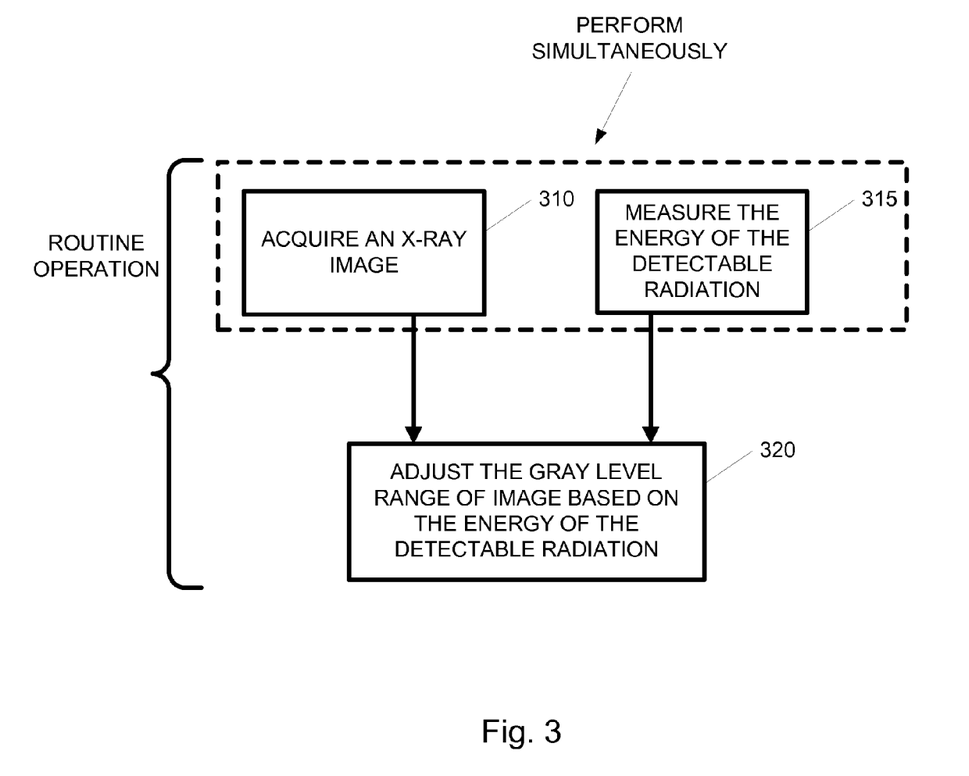
FIG. 3 is a flowchart illustration of a method for normalization of gray level values based on detectable energy level in a multi-camera flat panel X-Ray detector according to embodiments of the present invention.

Reference is now made to FIG. 3 which is a flowchart illustration of a method for normalization of gray level values based on detectable energy level in a multi-camera flat panel X-Ray detector according to embodiments of the present invention. According to embodiments of the present invention, during routine operation of detector 100, X-Ray images may be acquired 310. For example, a set of partial images may be acquired and processed according to embodiments of the present invention described hereinabove. Substantially simultaneously with acquiring each of the sets of partial images, a corresponding level of energy of the detectable radiation at an area adjacent to the imaging sensors is measured 315, for example, by energy measurement unit 130. The gray level range and the gray level values may be normalized based on the measured detectable radiation. Hence, up to a certain range, variations of intensity of detectable radiation impinging on imaging sensors 106 during image acquisition may substantially have no effect on the perceivable image intensity. The normalized image may be presented to a viewer.

Some embodiments of the present invention may be implemented in software for execution by a processor-based system, for example, the approximations of inverse response function F. For example, embodiments of the present invention may be implemented in code and may be stored on a non-transitory storage medium, such as memory unit 109, having stored thereon instructions which can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A multi-camera flat panel X-Ray detector, the detector comprising:
  a scintillator to convert X-Ray radiation generated by an X-Ray source into detectable radiation;
  at least one optical module, each optical module comprising a lens having a vignetting factor and an imaging sensor, wherein the imaging sensor is configured to acquire, during a linearization phase, at least two images related to the detectable radiation, at a field of view of the at least one imaging sensor, wherein the intensity of the X-Ray radiation generated by the X-Ray source is different for each of the at least two images, and wherein the lens is adapted to focus the detectable radiation onto the imaging sensor;
  a light energy measurement unit configured to measure, during the linearization phase, substantially simultaneously with the acquiring of each of the at least two images, at least two corresponding levels of energy of the detectable radiation, wherein the light energy measurement unit is substantially linear at the range of operation; and
  a processing unit comprising a processor and memory, wherein the processing unit is configured to:
    obtain the at least two images from the at least one imaging sensor;
    obtain the at least two levels of energy from the light energy measurement unit; and
    calculate an inverse response function to the at least one imaging sensor based on the at least two images and on the at least two levels of energy, wherein the inverse response function is calculated based on an equality between a relation between detectable radiation energy level present at a first area within a FOV of the at least one imaging sensor while acquiring a first image to detectable radiation energy level present at the first area while acquiring a second image and a relation between detectable radiation energy level present at a second area of a FOV of the at least one imaging sensor while acquiring the first image to the detectable radiation energy level present at the second area while acquiring the second image, and a relation between a level of detectable radiation energy detected by the light energy measurement unit while acquiring the first image to a level of detectable radiation energy detected by the light energy measurement unit while acquiring the second image.

2. The detector of claim 1, wherein the processing unit is further configured to adjust output images of the at least one imaging sensor acquired during routine operation of the detector, using the inverse response function.

3. The detector of claim 1, further comprising a phantom to be placed during the linearization phase, between the X-Ray source and the detector, wherein the phantom has varying X-Ray absorption levels along the field of view of the at least one imaging sensor.

4. The detector of claim 3, wherein the processing unit is configured to calculate the inverse response function based on different readings of different pixels of each of the at least two images.

5. The detector of claim 4, wherein the at least one imaging sensor to acquire two images and two corresponding levels of energy.

6. The detector of claim 1, wherein the inverse response function is a polynomial function.

7. The detector of claim 1, wherein exposure time of the X-Ray source is different for each of the least two images.

8. The detector of claim 1, wherein the light energy measurement unit comprises:
  at least one photo detector to detect levels of energy of the detectable radiation; and
  an analog to digital converter configured to receive the detected levels of energy, and to convert the detected levels of energy into a digital measure of the levels of energy.

9. A method for linearization of photometric response of an imaging sensor of a multi-camera flat panel X-Ray detector, the method comprising:
  providing a scintillator configured to convert X-Ray radiation generated by an X-Ray source into detectable radiation;
  providing at least one optical module, each comprising a lens having a vignetting factor and an imaging sensor, wherein the lens is adapted to focus the detectable radiation onto the imaging sensor;
  acquiring by the imaging sensor, during a linearization phase, at least two images related to detectable radiation present at a field of view of the imaging sensor, the detectable radiation corresponding to X-Ray radiation generated by an X-Ray source, wherein the intensity of the X-Ray radiation generated by the X-Ray source is different for each of the at least two images;
  measuring by a light energy measurement unit, during the linearization phase, substantially simultaneously with the acquiring of each of the at least two images, at least two corresponding levels of energy of the detectable radiation, wherein the light energy measurement unit is substantially linear at the range of operation; and
  calculating an inverse response function to the imaging sensor based on the at least two images and on the at least two levels of energy, wherein the inverse response function is calculated based on an equality between a relation between detectable radiation energy level present at a first area within a FOV of the at least one imaging sensor while acquiring a first image to detectable radiation energy level present at the first area while acquiring a second image, and a relation between detectable radiation energy level present at a second area of a FOV of the at least one imaging sensor while acquiring the first image to the detectable radiation energy level present at the second area while acquiring the second image, and a relation between a level of detectable radiation energy detected by the light energy measurement unit while acquiring the first image to a level of detectable radiation energy detected by the light energy measurement unit while acquiring the second image.

10. The method of claim 9, further comprising:
adjusting output images of the imaging sensor acquired during routine operation of the detector, using the inverse response function.

11. The method of claim 9, further comprising:
placing a phantom, during the linearization phase, between the X-Ray source and the detector, wherein the phantom has varying X-Ray absorption levels along the field of view of the imaging sensor.

12. The method of claim 11, wherein calculating the inverse response function is based on different readings of different pixels of each of the at least two images.

13. The method of claim 12, wherein two images are acquired and two corresponding levels of energy are measured.

14. The method of claim 9, wherein the inverse response function is a polynomial function.

15. The method of claim 9, further comprising:
using different exposure time of the X-Ray source for each of the least two images.

16. The method of claim 9, wherein measuring the at least two corresponding levels of energy of the detectable radiation comprises:
detecting levels of energy of the detectable radiation by at least one photo detector; and
converting the detected levels of energy into a digital measure of the levels of energy.

17. The device of claim 1, wherein the inverse response function is approximated by a polynomial $$E_L(x_s, y_s) = \sum_{n=0}^{p} c_n(E_s(x_s, y_s))^n,$$

where $c_n$ are coefficients of the polynomial, and p is the degree of the polynomial, $E_S(x_S, y_S)$ are output signals at sensor pixel $(x_s, y_s)$ and $E_L(x_s, y_s)$ are output signal at the sensor pixel $(x_s, y_s)$ after linearization, and wherein the coefficients $c_n$ are calculated using the following set of linear equations $$\sum_{n=0}^{p} c_n(E_s^i(x_s, y_s))^n = R^{ij} \sum_{n=0}^{p} c_n(E_s^j(x_s, y_s))^n,$$

where i and j denote data sets of images and corresponding levels of energy, and $R^{ij}$ is the relation between a level of detectable radiation energy detected by the light energy measurement unit while acquiring the first image to a level of detectable radiation energy detected by the light energy measurement unit while acquiring the second image.

18. The method of claim 9, wherein the inverse response function is approximated by a polynomial $$E_L(x_s, y_s) = \sum_{n=0}^{p} c_n(E_s(x_s, y_s))^n,$$

where $c_n$ are coefficients of the polynomial, and p is the degree of the polynomial, $E_S(x_S, y_S)$ are output signals at sensor pixel $(x_s, y_s)$ and $E_L(x_s, y_s)$ are output signal at the sensor pixel $(x_s, y_s)$ after linearization, and wherein the coefficients $c_n$ are calculated using the following set of linear equations $$\sum_{n=0}^{p} c_n(E_s^i(x_s, y_s))^n = R^{ij} \sum_{n=0}^{p} c_n(E_s^j(x_s, y_s))^n,$$

where i and j denote data sets of images and corresponding levels of energy, and $R^{ij}$ is the relation between a level of detectable radiation energy detected by the light energy measurement unit while acquiring the first image to a level of detectable radiation energy detected by the light energy measurement unit while acquiring the second image.

* * * * *